(12) United States Patent
Yang et al.

(10) Patent No.: US 11,974,151 B2
(45) Date of Patent: Apr. 30, 2024

(54) MEASUREMENT INDICATION METHOD, APPARATUS, AND SYSTEM

(71) Applicant: VIVO MOBILE COMMUNICATION CO., LTD., Chang'an Dongguan (CN)

(72) Inventors: Xiaodong Yang, Chang'an Dongguan (CN); Qian Zheng, Chang'an Dongguan (CN); Wei Bao, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 533 days.

(21) Appl. No.: 17/152,326

(22) Filed: Jan. 19, 2021

(65) Prior Publication Data
US 2021/0144576 A1    May 13, 2021

Related U.S. Application Data

(63) Continuation of application No. PCT/CN2019/096373, filed on Jul. 17, 2019.

(30) Foreign Application Priority Data

Jul. 20, 2018 (CN) .......................... 201810806688.0

(51) Int. Cl.
*H04W 24/10* (2009.01)
*H04W 72/0453* (2023.01)
*H04W 72/23* (2023.01)

(52) U.S. Cl.
CPC ....... *H04W 24/10* (2013.01); *H04W 72/0453* (2013.01); *H04W 72/23* (2023.01)

(58) Field of Classification Search
CPC . H04W 24/10; H04W 72/0453; H04W 72/23; H04W 48/12; H04W 24/08;
(Continued)

(56) References Cited

U.S. PATENT DOCUMENTS 9,521,598 B2 * 12/2016 Nie .................... H04W 36/0085
10,225,747 B2 * 3/2019 Dhanapal ............ H04W 72/542
(Continued)

FOREIGN PATENT DOCUMENTS

CN    101594664 A    12/2009
CN    102754491 A    10/2012
(Continued)

OTHER PUBLICATIONS

Extended European Search Report for related Application No. 19837944.8; reported on Sep. 10, 2021.
(Continued)

*Primary Examiner* — Brian T O Connor
(74) *Attorney, Agent, or Firm* — von Briesen & Roper, s.c.

(57) ABSTRACT

Provided are a measurement indication method, an apparatus, and a system. The specific solution is as follows: UE receives first information sent by a network-side device, where the first information is measurement configuration information or system information; and the UE determines second information based on the first information, where the second information includes a first target radio access technology RAT type. The first information is the measurement configuration information, and the second information is used to indicate a region measured by the UE and corresponding to the first target RAT type; or the first information is the system information, and the second information is used to indicate that a measurement result obtained through measurement by the UE and corresponding to the first target RAT type is valid.

20 Claims, 7 Drawing Sheets

(58) Field of Classification Search
CPC ......... H04W 36/0058; H04W 36/0085; H04W 36/0094; H04W 36/14; H04W 36/0088; H04W 72/542; H04W 88/02; H04W 88/06; H04W 36/0061; H04L 5/001; H04L 5/0053

See application file for complete search history.

(56) References Cited

U.S. PATENT DOCUMENTS

| | | | | |
|---|---|---|---|---|
| 10,244,415 | B2* | 3/2019 | Zhang | H04W 72/0453 |
| 10,390,247 | B2* | 8/2019 | Raghunathan | H04W 24/08 |
| 10,542,447 | B2* | 1/2020 | Lee | H04W 24/10 |
| 10,652,790 | B2* | 5/2020 | Lu | H04W 36/0094 |
| 11,381,445 | B2* | 7/2022 | Parkvall | H04W 52/028 |
| 11,528,623 | B2* | 12/2022 | Dhanapal | H04W 24/08 |
| 2008/0014957 | A1 | 1/2008 | Ore | |
| 2012/0088499 | A1 | 4/2012 | Chin et al. | |
| 2012/0165020 | A1 | 6/2012 | Iwamura | |
| 2012/0213107 | A1 | 8/2012 | Jang et al. | |
| 2012/0329471 | A1 | 12/2012 | Barta et al. | |
| 2013/0178224 | A1 | 7/2013 | Chang | |
| 2013/0273916 | A1 | 10/2013 | Gupta | |
| 2015/0319667 | A1 | 11/2015 | Dalsgaard et al. | |
| 2016/0330641 | A1* | 11/2016 | Zhang | H04W 72/0453 |
| 2017/0006510 | A1 | 1/2017 | Kaikkonen et al. | |
| 2019/0014553 | A1 | 1/2019 | Feng | |
| 2019/0182729 | A1 | 6/2019 | Lu et al. | |
| 2019/0215742 | A1 | 7/2019 | Lu et al. | |

FOREIGN PATENT DOCUMENTS

| | | |
|---|---|---|
| CN | 103262603 A | 8/2013 |
| CN | 103392301 A | 11/2013 |
| CN | 104871593 A | 8/2015 |
| CN | 106304271 A | 1/2017 |
| CN | 107493589 A | 12/2017 |
| CN | 107580348 A | 1/2018 |
| CN | 107911832 A | 4/2018 |
| CN | 108156627 A | 6/2018 |
| CN | 108200598 A | 6/2018 |
| JP | 2011010149 A | 1/2011 |
| WO | 2012006122 A1 | 1/2012 |
| WO | 2012039440 A1 | 3/2012 |
| WO | 2017041274 A1 | 3/2017 |
| WO | 2017160854 A1 | 9/2017 |

OTHER PUBLICATIONS

Nokia, Nokia Shanghai Bell, "Finalizing IDLE mode measurements for euCA", May 21-25, 2018, 3GPP TSG-RAN WG2 Meeting #102, Busan, South Korea.

Nokia, Nokia Shanghai Bell, "Stage-2 description of euCA", May 21-25, 2018, 3GPP TSG-RAN WG2 Meeting #102, Busan, South Korea.

Ericsson, "Motiviation for EN-DOC Enhancements", Mar. 18, 2018, retrieved from the internet: URL: http://www.3gpp.org/ftp/Meetings%5F3GPP%5FSYNC/RAN/Docs/.

Japanese Reasons For Refusal Office Action related to JP Application No. 2021-525355 reported on Mar. 24, 2022.

International Search Report & Written Opinion related to Application No. PCT/CN2019/096373; reported on Sep. 27, 2019.

Chinese Office Action for related Application No. 201810806688.0; reported on May 26, 2020.

Chinese Search Report for related Application No. 201810806688.0; reported on Apr. 2, 2020.

Ericsson, "E-UTRA Radio Measurement Configuration", Jun. 25-29, 2007, TSG-RAN WG2 #58bis, Orlando, USA.

First Singaporean Office Action related to Application No. 11202100633T reported on Oct. 7, 2022.

R1-1806708—Source: OPPO "Further Discussion on UE behaviour for Idle Mode Measurement with Validity Area", Agenda item: 9.9.2, Document for: Discussion, Decision, 3GPP TSG-RAN2 Meeting #102, Busan, Korea, May 21-25, 2018.

* cited by examiner

MEASUREMENT INDICATION METHOD, APPARATUS, AND SYSTEM

This application is a continuation application of PCT International Application No. PCT/CN2019/096373 filed on Jul. 17, 2019, which claims priority to Chinese Patent Application No. 201810806688.0, filed with the China National Intellectual Property Administration on Jul. 20, 2018 and entitled "MEASUREMENT INDICATION METHOD, APPARATUS, AND SYSTEM", both disclosures of which are incorporated herein by reference in their entireties.

TECHNICAL FIELD

Embodiments of the present disclosure relate to the field of communications technologies, and in particular, to a measurement indication method, an apparatus, and a system.

BACKGROUND

In a long term evolution (Long Term Evolution, LTE) system, carrier aggregation (Carrier Aggregation, CA) allows user equipment (User Equipment, UE) to communicate with a base station through a plurality of cells. In the plurality of cells, one cell is a primary cell, and all the other cells are secondary cells. The primary cell is always in an active state, while the secondary cells may be in an active state or an inactive state.

At present, in the LTE system, during activation of a carrier corresponding to a secondary cell, the base station can send measurement indication information to the connected-state UE to indicate a frequency to be measured when the UE is in an idle state. After the UE in the idle state measures the frequency indicated by the base station, the UE reports a measurement result to the base station when the UE is in the connected state. In this case, the base station can configure a secondary cell for the UE based on the measurement result, and activate the secondary cell.

However, with emergence of the new radio (New Radio, NR) system, the UE may need to perform the foregoing measurement in the NR system. When the LTE system and the NR system coexist, if the UE is in the connected state in only one system and in a non-connected state in the other system, the UE is only able to perform measurement in the one system and cannot perform measurement in the other system according to the foregoing measurement manner. As a result, the other system cannot configure a secondary cell for the UE in a timely manner.

SUMMARY

Embodiments of the present disclosure provide a measurement indication method, an apparatus, and a system to resolve the problem that a secondary cell fails to be configured for UE in a timely manner.

To resolve the foregoing technical problem, the following technical solutions are used in the embodiments of the present disclosure:

According to a first aspect of the embodiments of the present disclosure, a measurement indication method is provided. The measurement indication method includes: receiving, by UE, first information sent by a network-side device, where the first information is measurement configuration information or system information; and determining, by the UE, second information based on the first information, where the second information includes a first target radio access technology (Radio Access Technology, RAT) type. The first information is the measurement configuration information, and the second information is used to indicate a region measured by the UE and corresponding to the first target RAT type; or the first information is the system information, and the second information is used to indicate that a measurement result obtained through measurement by the UE and corresponding to the first target RAT type is valid.

According to a second aspect of the embodiments of the present disclosure, a measurement indication method is provided. The measurement indication method includes: sending, by a network-side device, first information to UE, where the first information is measurement configuration information or system information; the first information is used to determine second information; and the second information includes a first target RAT type. The first information is the measurement configuration information, and the second information is used to indicate a region measured by the UE and corresponding to the first target RAT type; or the first information is the system information, and the second information is used to indicate that a measurement result obtained through measurement by the UE and corresponding to the first target RAT type is valid.

According to a third aspect of the embodiments of the present disclosure, UE is provided. The UE includes a receiving unit and a determining unit. The receiving unit is configured to receive first information sent by a network-side device, where the first information may be measurement configuration information or system information. The determining unit is configured to determine second information based on the first information received by the receiving unit, where the second information may include a first target RAT type. The first information is the measurement configuration information, and the second information is used to indicate a region measured by the UE and corresponding to the first target RAT type; or the first information is the system information, and the second information is used to indicate that a measurement result obtained through measurement by the UE and corresponding to the first target RAT type is valid.

According to a fourth aspect of the embodiments of the present disclosure, a network-side device is provided. The network-side device includes a sending unit. The sending unit is configured to send first information to UE, where the first information is measurement configuration information or system information, the first information is used to determine second information, and the second information includes a first target RAT type. The first information is the measurement configuration information, and the second information is used to indicate a region measured by the UE and corresponding to the first target RAT type; or the first information is the system information, and the second information is used to indicate that a measurement result obtained through measurement by the UE and corresponding to the first target RAT type is valid.

According to a fifth aspect of the embodiments of the present disclosure, UE is provided. The UE includes a processor, a memory, and a computer program stored in the memory and capable of running on the processor. When the computer program is executed by the processor, the steps of the measurement indication method according to the foregoing first aspect are implemented.

According to a sixth aspect of the embodiments of the present disclosure, a network-side device is provided. The network-side device includes a processor, a memory, and a computer program stored in the memory and capable of running on the processor. When the computer program is executed by the processor, the steps of the measurement indication method according to the foregoing second aspect are implemented.

According to a seventh aspect of the embodiments of the present disclosure, a communications system is provided. The communications system includes the UE in the foregoing third aspect and the network-side device in the foregoing fourth aspect. Alternatively, the communications system includes the UE in the foregoing fifth aspect and the network-side device in the foregoing sixth aspect.

According to an eighth aspect of the embodiments of the present disclosure, a computer-readable storage medium is provided. The computer-readable storage medium stores a computer program, and when the computer program is executed by a processor, the steps of the measurement indication method in the foregoing first aspect or second aspect are implemented.

In the embodiments of the present disclosure, UE may determine, based on received first information (the first information may be measurement configuration information or system information), second information that includes a first target RAT type (the second information is used to indicate a region measured by the UE and corresponding to the first target RAT type, or is used to indicate that a measurement result obtained through measurement by the UE and corresponding to the first target RAT type is valid). The UE may determine the region measured by the UE and corresponding to the first target RAT type based on the measurement configuration information, so that the UE can quickly and accurately measure the region corresponding to the first target RAT type and then a system corresponding to the first target RAT type can configure a secondary cell for the UE in a timely manner. Alternatively, based on the received system information, the UE determines that the reported measurement result obtained through measurement by the UE and corresponding to the first target RAT type is valid when the measurement result reported by the UE to the network-side device is valid, so that the UE can quickly and accurately indicate to the network-side device that the measurement result obtained through measurement by the UE and corresponding to the first target RAT type is valid and then a system corresponding to the first target RAT type can configure a secondary cell for the UE in a timely manner.

DESCRIPTION OF EMBODIMENTS

Figure 1:
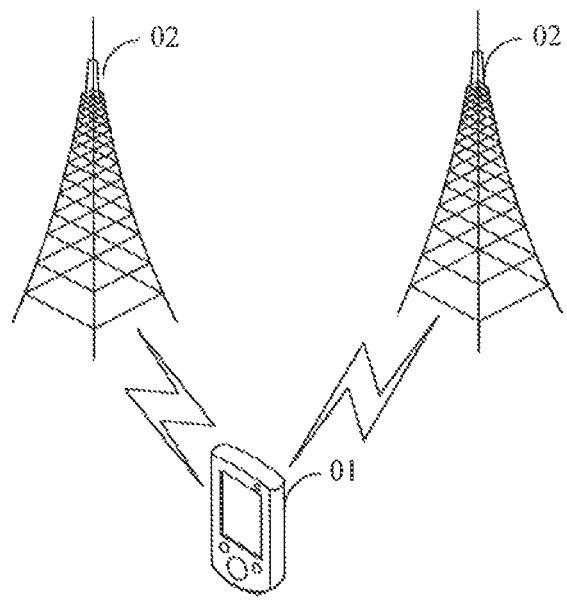
FIG. 1 is a schematic architectural diagram of a communications system according to an embodiment of the present disclosure.

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of this application.

In the specification of the embodiments and the claims of the present disclosure, the terms "first", "second", and so on are intended to distinguish between different objects but do not indicate a particular order of the objects. For example, a first network-side device, a second network-side device, and so on are used to distinguish between different network-side devices but does not indicate a particular order of the network-side devices. In the descriptions of the embodiments of the present disclosure, "plurality" indicates two or more, unless otherwise specified.

The term "and/or" in the specification describes an association relationship for describing associated objects and represents that three relationships may exist. For example, A and/or B may represent the following three cases: Only A exists, both A and B exist, and only B exists. The symbol "/" herein indicates an "or" relationship of associated objects. For example, A/B means A or B.

In the embodiments of the present disclosure, the word such as "example" or "for example" is used to represent giving an example, an instance, or an illustration. Any embodiment or design solution described as "an example" or "for example" in the embodiments of the present disclosure shall not be interpreted to be more preferential or advantageous than other embodiments or design solutions. To be precise, the terms such as "example" or "for example" are intended to present a related concept in a specific manner.

Some concepts and/or terms used in the measurement indication method, the apparatus, and the system that are provided in the embodiments of the present disclosure are explained below.

Carrier aggregation: Allow UE to communicate with a network-side device through a plurality of cells (cell). In the plurality of cells, one cell is a primary cell (Pcell), and all the other cells are secondary cells (Scell). The secondary cells may be in an active state or an inactive state, and the primary cell is always in an active state and never in an inactive state.

Non-connected: Currently, in an LTE system, only a connected state and an idle state (idle state) are available. In an NR system, in addition to a connected state and an idle state, an independent radio resource control (Radio Resource Control, RRC) state is introduced. The RRC state is called an inactive state. The idle state and the inactive state can be referred to as non-connected states.

The embodiments of the present disclosure provide a measurement indication method, an apparatus, and a system.

UE may determine, based on received first information (the first information may be measurement configuration information or system information), second information that includes a first target RAT type (the second information is used to indicate a region measured by the UE and corresponding to the first target RAT type, or is used to indicate that a measurement result obtained through measurement by the UE and corresponding to the first target RAT type is valid). The UE may determine the region measured by the UE and corresponding to the first target RAT type based on the measurement configuration information, so that the UE can quickly and accurately measure the region corresponding to the first target RAT type and then a system corresponding to the first target RAT type can configure a secondary cell for the UE in a timely manner. Alternatively, based on the received system information, the UE determines that the reported measurement result obtained through measurement by the UE and corresponding to the first target RAT type is valid when the measurement result reported by the UE to the network-side device is valid, so that the UE can quickly and accurately indicate to the network-side device that the measurement result obtained through measurement by the UE and corresponding to the first target RAT type is valid and then a system corresponding to the first target RAT type can configure a secondary cell for the UE in a timely manner.

The measurement indication method, the apparatus, and the system that are provided by the embodiments of the present disclosure may be applied to a communications system. They may be specifically applied to a process in which the UE performs measurement or reports that the measurement result is valid in the communications system in a scenario where a plurality of systems (for example, the LTE system and NR system) coexist.

For example, FIG. 1 is a schematic architectural diagram of a communications system according to an embodiment of the present disclosure. As shown in FIG. 1, the communications system may include UE 01 and at least one network-side device (for example, at least one base station 02; two base stations in FIG. 1). A connection may be established between the UE 01 and the at least one base station 02.

The UE may be a device that provides a user with voice and/or data connectivity, a handheld device with a wired/wireless connection function, or another processing device connected to a wireless modem. The UE may communicate with one or more core network devices through a radio access network (Radio Access Network, RAN). The UE may be a mobile terminal, such as a mobile phone (or referred to as a "cellular" phone) and a computer with a mobile terminal, or may be a portable, pocket-sized, handheld, computer built-in or vehicle-mounted mobile apparatus, which exchanges a voice and/or data with the RAN. For example, the UE is a device such as a personal communication service (Personal Communication Service, PCS) phone, a cordless telephone set, a session initiation protocol (SIP) phone, a wireless local loop (Wireless Local Loop, WLL) station, or a personal digital assistant (Personal Digital Assistant, PDA). The UE may also be referred to as a user agent (User Agent), a terminal device, or the like.

The base station is an apparatus deployed in a RAN and configured to provide a wireless communication function for the UE. The base station may include various forms of macro base stations, micro base stations, relay nodes, access points, and the like. In systems using different radio access technologies, a device with a base station function may have different names. For example, in a third-generation mobile communication (3G) network, it is referred to as a base station (Node B); in an LTE system, it is referred to as an evolved base station (evolved NodeB, eNB or eNodeB); in a fifth-generation mobile communication (5G) network, it is referred to as a gNB, and so on. With evolution of communications technologies, the name "base station" may change.

The following details the measurement indication method, the apparatus, and the system that are provided in the embodiments of the present disclosure through specific embodiments and application scenarios thereof with reference to the accompanying drawings.

At present, in the prior art, when the LTE system and the NR system coexist, if the UE is in a connected state in one system and in a non-connected state in the other system, the UE is merely able to perform measurement in the one system and cannot perform measurement in the other system according to an existing measurement manner. As a result, the other system cannot configure a secondary cell for the UE in a timely manner.

To resolve the foregoing technical problem, this embodiment of the present disclosure provides a measurement indication method. Interaction between UE and a network-side device (for example, a first network-side device and a second network-side device) is used as an example to describe the measurement indication method provided in this embodiment of the present disclosure. The first network-side device is a network-side device that is connected to the UE before the UE moves, and the second network-side device is a network-side device that is connected to the UE after the UE moves (for example, moving from a first region to a second region). The first network-side device and the second network-side device may be a same network-side device or different network-side devices. When the UE is located in a cell, the first network-side device and the second network-side device may be a same network-side device. When the UE moves between different cells (the first network-side device and the second network-side device separately provide a service for the different cells), the first network-side device and the second network-side device may be different network-side devices.

It should be noted that, in each method embodiment of the present disclosure, to distinguish between system information sent by the first network-side device and system information sent by the second network-side device, the system information sent by the first network-side device may be called first system information, and the system information sent by the second network-side device may be called second system information.

Figure 2:
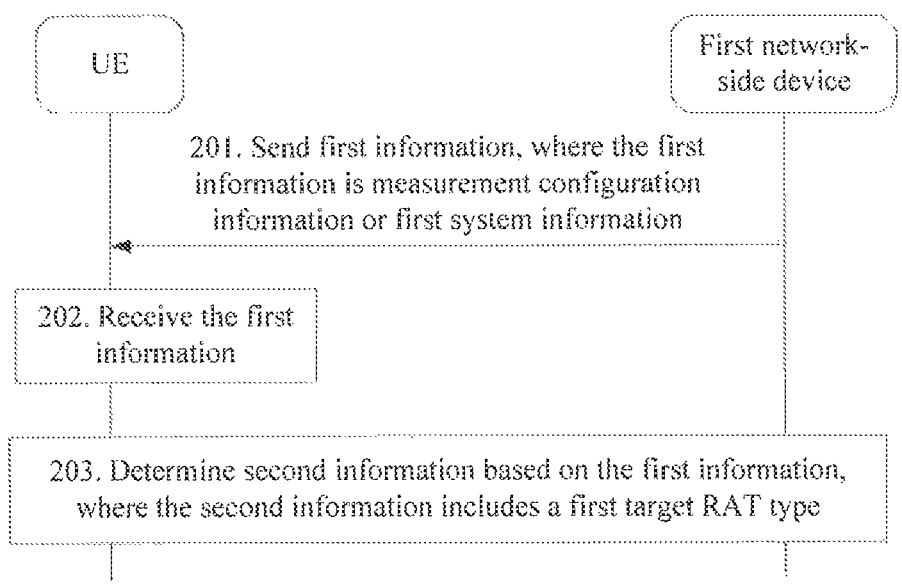
FIG. 2 is a schematic diagram 1 of a measurement indication method according to an embodiment of the present disclosure.

Based on the communications system shown in FIG. 1, this embodiment of the present disclosure provides a measurement indication method. As shown in FIG. 2, the measurement indication method may include the following steps 201 to 203.

Step 201: The first network-side device sends first information to the UE, where the first information is measurement configuration information or the first system information.

Optionally, in this embodiment of the present disclosure, the foregoing measurement configuration information may be used to indicate measurement information obtained through measurement by the UE in a non-connected state; and the foregoing first system information may include indication information reported by the UE to the first network-side device and indicating that a measurement result is valid.

Optionally, in this embodiment of the present disclosure, the first network-side device may send the measurement configuration information to the UE through an RRC message, or the first network-side device may indicate to the UE information about the measurement result required by the first network-side device through a system information block (System Information Block, SIB).

Optionally, in this embodiment of the present disclosure, the foregoing measurement configuration information may be used to indicate a RAT type corresponding to measurement by the UE in a non-connected state; and the foregoing first system information may be used to indicate the measurement result corresponding to a frequency and/or the RAT type required by the first network-side device.

Step 202: The UE receives the first information sent by the first network-side device.

Step 203: The UE determines second information based on the first information, where the second information includes a first target RAT type.

In this embodiment of the present disclosure, the foregoing first information is the measurement configuration information, and the second information is used to indicate a region measured by the UE and corresponding to the first target RAT type. Alternatively, the foregoing first information is the first system information, and the second information is used to indicate that the measurement result obtained through measurement by the UE and corresponding to the first target RAT type is valid (specifically, the second information is used to indicate that the measurement result of the region measured by the UE and corresponding to the first target RAT type is valid).

It can be understood that in this embodiment of the present disclosure, the UE may determine the region measured by the UE in a non-connected state and corresponding to the first target RAT type based on the measurement configuration information; or the UE may determine, from some measurement results of the UE, that the measurement result of the region measured by the UE and corresponding to the first target RAT type is valid based on the first system information.

For example, it is assumed that the first system information is used to indicate a frequency 1 and that a RAT type corresponding to the frequency 1 is an LTE RAT. Then, the UE may determine that the first target RAT type included in the second information is the LTE RAT based on the frequency 1 indicated by the first system information, and may report to the first network-side device that the measurement result of the region corresponding to the LTE RAT is valid.

Optionally, in this embodiment of the present disclosure, the UE is located in a first region, the first network-side device serves a cell in which the first region is located, the first target RAT type may include a RAT type corresponding to at least one second region, and a RAT type corresponding to each of the at least one second region is different from the RAT type corresponding to the first region.

Optionally, in this embodiment of the present disclosure, the foregoing first region and second region may be different regions of one cell, or the foregoing first region and second region may be different regions of two cells.

Optionally, in this embodiment of the present disclosure, the RAT type may include the LTE RAT and an NR RAT.

For example, assume that the first region is a cell 1 (a RAT type corresponding to the cell 1 is the LTE RAT) and that the UE is in a connected state in the cell 1. Then, the first target RAT type may include a RAT type corresponding to a cell 2 and the RAT type corresponding to the cell 2 is the NR RAT.

Optionally, in this embodiment of the present disclosure, the foregoing first target RAT type may further include the RAT type corresponding to the first region.

Optionally, in this embodiment of the present disclosure, the foregoing measurement configuration information may include the first target RAT type, or the first target RAT type and at least one first measurement frequency. The foregoing first system information may include at least one of the first target RAT type or at least one second measurement frequency.

For example, assume that the first target RAT type includes the LTE RAT and the NR RAT, that the at least one first measurement frequency corresponding to the LTE RAT is a frequency 2 and a frequency 3, and that the at least one first measurement frequency corresponding to the NR RAT is the frequency 3 and a frequency 4. Then, the LTE RAT may be used for the UE to measure the region corresponding to the LTE RAT at the frequency 2 and the frequency 3, and the NR RAT may be used for the UE to measure the region corresponding to the NR RAT at the frequency 3 and the frequency 4. In other words, the UE may measure the region corresponding to the LTE RAT and the region corresponding to the NR RAT at the frequency 3.

Optionally, in this embodiment of the present disclosure, the foregoing measurement configuration information may further include a first identifier and fourth indication information. The first identifier is used to indicate a target region, a RAT type corresponding to the target region includes at least two RAT types, and the first target RAT type is one of the at least two RAT types. The fourth indication information is used to instruct the UE to measure the target region for the first target RAT type.

Optionally, in this embodiment of the present disclosure, the foregoing measurement configuration information may further include a first identifier and target indication information, where the fourth indication information is used to instruct the UE to measure the target region for the first target RAT type.

It should be noted that in the embodiments of the present disclosure, the foregoing fourth indication information corresponds to the target indication information.

Optionally, in this embodiment of the present disclosure, the foregoing first identifier may include a frequency and a physical cell identifier (Physical Cell Identifier, PCI).

Optionally, in this embodiment of the present disclosure, the foregoing fourth indication information is used to instruct the UE to measure the target region for the first target RAT type at the frequency in the first identifier.

For example, assume that the RAT type corresponding to the target region includes the LTE RAT and the NR RAT. The fourth indication information may be used to instruct the UE to use one RAT type (for example, the NR RAT) in the two RAT types to perform measurement.

Optionally, in this embodiment of the present disclosure, the foregoing target region may be a cell or the region in a cell.

Optionally, in this embodiment of the present disclosure, the foregoing measurement configuration information may further include a first identifier and target indication information, where the first identifier is used to indicate a target region, a RAT type corresponding to the target region includes at least two RAT types, the first target RAT type is one of the at least two RAT types, and the target indication information is used to instruct the UE to measure the target region for the first target RAT type.

Optionally, in this embodiment of the present disclosure, after the UE determines second information, when the UE is in a non-connected state, the UE may perform measurement (that is, measure the region corresponding to the first target RAT type) based on the second information to obtain a measurement result. Alternatively, after the UE determines the second information, the UE may report that the measurement result obtained through measurement by the UE and corresponding to the first target RAT type is valid based on the second information.

Optionally, in this embodiment of the present disclosure, based on the second information, the UE may perform measurement for each first RAT type to obtain the measurement result according to the following method S1.

S1. Measure the region corresponding to one RAT type at the at least one first measurement frequency corresponding to one first RAT type.

For example, the UE is in a connected state in an NR cell. The UE receives measurement configuration information sent by the first network-side device, and determines second information based on the measurement configuration information. When the UE is in a non-connected state and camps on the NR cell, the UE does not perform measurement; when the UE moves to an LTE cell, the UE may perform measurement based on the determined second information to obtain the measurement result.

For another example, assuming that the UE is in a cell 3, the UE is in a connected state in the cell 3, the measurement configuration information sent by the first network-side device to the UE is as follows: When the UE in a non-connected state camps on a region 1 in the cell 3, the UE performs measurement at a frequency 5 and a frequency 6; and when the UE in a non-connected state camps on a region 2 in the cell 3, the UE performs measurement at the frequency 5, the frequency 6, and a frequency 7. In other words, when the UE in a non-connected state camps on the region 1, the UE performs measurement only at the frequency 5 and the frequency 6 to obtain the measurement result; and when the UE in a non-connected state moves from the region 1 to the region 2, the UE performs measurement at the frequency 5, the frequency 6, and the frequency 7 to obtain the measurement result.

Optionally, in this embodiment of the present disclosure, the measurement performed by the UE may be used in the process of quickly configuring CA and dual connectivity (Dual Connectivity, DC) by the UE, where the DC may be the dual connectivity between an evolved universal terrestrial radio access network (Evolved Universal Terrestrial Radio Access Network, E-UTRAN/NR) and the NR (that is, EN-DC), may be NE-DC, or may be LTE-LTE DC or NR-NR DC.

This embodiment of the present disclosure provides a measurement indication method. The UE may determine, based on the received first information (the first information may be the measurement configuration information or the first system information), the second information that includes the first target RAT type (the second information is used to indicate the region measured by the UE and corresponding to the first target RAT type, or is used to indicate that the measurement result obtained through measurement by the UE and corresponding to the first target RAT type is valid). The UE may determine the region measured by the UE and corresponding to the first target RAT type based on the measurement configuration information, so that the UE can quickly and accurately measure the region corresponding to the first target RAT type and then a system corresponding to the first target RAT type can configure a secondary cell for the UE in a timely manner. Alternatively, based on the received first system information, the UE may determine that the reported measurement result obtained through measurement by the UE and corresponding to the first target RAT type is valid when the measurement result reported by the UE to the first network-side device is valid, so that the UE can quickly and accurately indicate to the network-side device that the measurement result obtained through measurement by the UE and corresponding to the first target RAT type is valid and then a system corresponding to the first target RAT type can configure a secondary cell for the UE in a timely manner.

Figure 3:
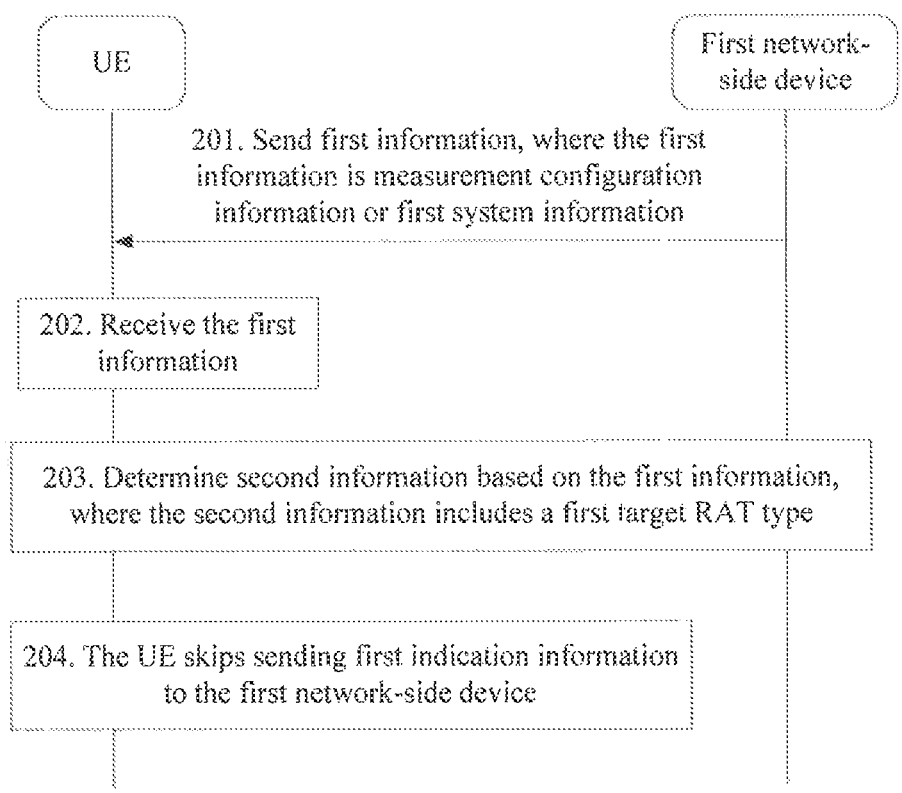
FIG. 3 is a schematic diagram 2 of a measurement indication method according to an embodiment of the present disclosure.

Optionally, in this embodiment of the present disclosure, with reference to FIG. 2, as shown in FIG. 3, after the foregoing step 203, the measurement indication method provided in this embodiment of the present disclosure may further include the following step 204.

Step 204: The UE skips sending the first indication information to the first network-side device.

In this embodiment of the present disclosure, the foregoing first indication information is used to indicate that the first measurement result obtained through measurement by the UE on the first region or the first target RAT is valid, and the first network-side device provides the service for the cell in which the first region is located.

In this embodiment of the present disclosure, when the UE is located in the first region, no matter whether the first network-side device indicates to the UE the measurement result required by the first network-side device, the UE may not send to the first network-side device the first indication information that the first measurement result obtained through measurement by the UE on the first region is valid.

Optionally, in this embodiment of the present disclosure, after the foregoing step 203, the measurement indication method provided in this embodiment of the present disclosure may further include the following step 205.

Step 205: The UE does not measure the region corresponding to the first target RAT type.

In this embodiment of the present disclosure, when the UE is located in the first region corresponding to the first target RAT type, no matter whether the first network-side device indicates to the UE the first measurement result required by the first network-side device, the UE may not measure the region corresponding to the first target RAT type.

In this embodiment of the present disclosure, after determining the second information, the UE may not send to the first network-side device the first indication information that the first measurement result obtained through measurement by the UE on the first region is valid, or may not measure the region corresponding to the first target RAT type.

Figure 4:
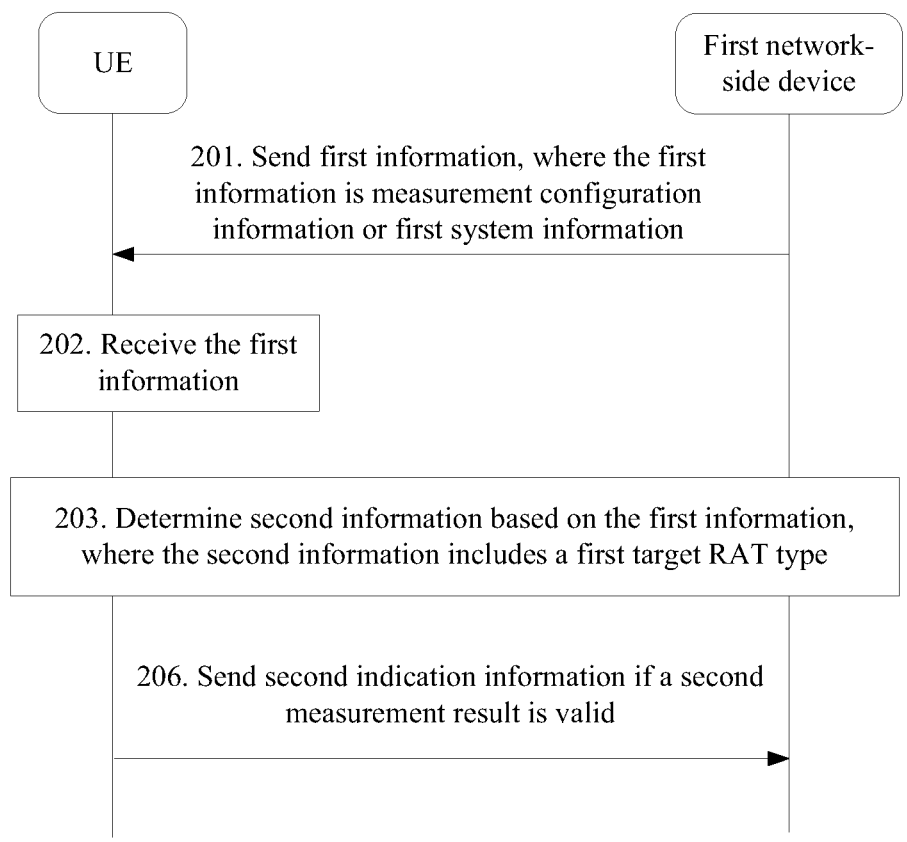
FIG. 4 is a schematic diagram 3 of a measurement indication method according to an embodiment of the present disclosure.

Optionally, in this embodiment of the present disclosure, the foregoing first system information may include the at least one second measurement frequency. The first system information is used to indicate that the first network-side device wants to receive a second measurement result or supports receiving a second measurement result, the second measurement result is the measurement result obtained through measurement on the first region measured at the at least one second measurement frequency, and the network-side device serves the cell in which the first region is located. With reference to FIG. 2, as shown in FIG. 4, after the foregoing step 203, the measurement indication method provided in this embodiment of the present disclosure may further include the following step 206.

Step 206: If the second measurement result is valid, the UE sends the second indication information to the first network-side device.

In this embodiment of the present disclosure, the foregoing second indication information is used to indicate that the second measurement result is valid.

Optionally, in this embodiment of the present disclosure, after the foregoing step 203, the measurement indication method provided in this embodiment of the present disclosure may further include the following step 207.

Step 207: The UE performs measurement at the at least one second measurement frequency to obtain the second measurement result.

It can be understood that in this embodiment of the present disclosure, the UE measures the first region at the at least one second measurement frequency to obtain the second measurement result.

For example, assume that the at least one second measurement frequency included in the first system information is a frequency 8, a frequency 9, and a frequency 10. The UE may measure the first region at the frequency 8, the frequency 9, and the frequency 10 to obtain the second measurement result.

In this embodiment of the present disclosure, after determining the second information, the UE may send to the first network-side device the second indication information indicating that the second measurement result is valid based on indication of the first system information; or may measure the first region based on indication of the first system information to obtain the second measurement result.

Figure 5:
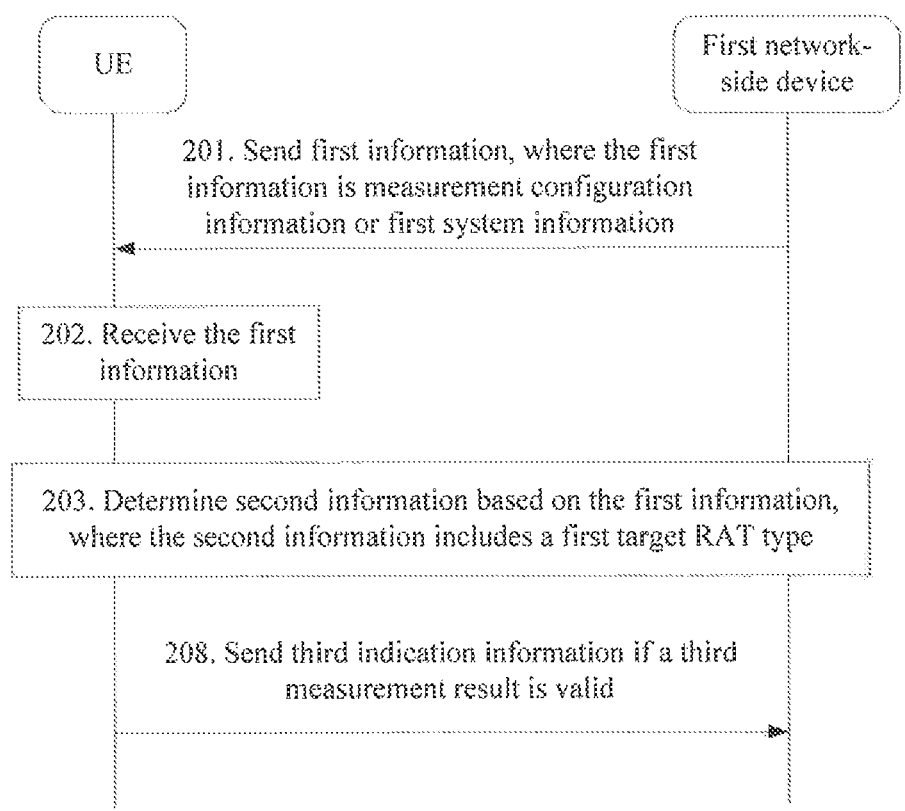
FIG. 5 is a schematic diagram 4 of a measurement indication method according to an embodiment of the present disclosure.

Optionally, in this embodiment of the present disclosure, the foregoing first system information may include the first target RAT type. The first system information is used to indicate that the first network-side device wants to receive a third measurement result or supports receiving a third measurement result, and the third measurement result is a measurement result obtained through measurement on the region corresponding to the first target RAT type. With reference to FIG. 2, as shown in FIG. 5, after the foregoing step 203, the measurement indication method provided in this embodiment of the present disclosure may further include the following step 208.

Step 208: If the third measurement result is valid, the UE sends third indication information to the network-side device, where the third indication information is used to indicate that the third measurement result is valid.

Optionally, in this embodiment of the present disclosure, after the foregoing step 203, the measurement indication method provided in this embodiment of the present disclosure may further include the following step 209.

Step 209: The UE measures the region corresponding to the first target RAT type to obtain the third measurement result.

In this embodiment of the present disclosure, after determining the second information, the UE may send to the first network-side device the third indication information indicating that the third measurement result is valid based on indication of the first system information; or may measure the region corresponding to the first target RAT type based on indication of the first system information to obtain the third measurement result.

Optionally, in a possible implementation of this embodiment of the present disclosure, after the foregoing step 203, the measurement indication method provided in this embodiment of the present disclosure may further include the following step 301.

Step 301: After the UE moves from the first region to the second region, the UE skips sending the first indication information to the second network-side device.

In this embodiment of the present disclosure, the first network-side device serves the cell in which the foregoing first region is located, the second network-side device serves the cell in which the second region is located, and the foregoing first indication information is used to indicate that the first measurement result obtained through measurement by the UE on the first region is valid.

In this embodiment of the present disclosure, when the UE is located in the first region and is in a non-connected state, the UE may measure the first region to obtain the first measurement result, and then the UE moves from the first region to the second region. After the UE is in a connected state (that is, the UE is connected to the second network-side device), no matter whether the second network-side device indicates to the UE the first measurement result required by the second network-side device, the UE may not send to the second network-side device the first indication information that the first measurement result obtained through measurement by the UE on the first region is valid.

Optionally, in another possible implementation of this embodiment of the present disclosure, after the foregoing step 203, the measurement indication method provided in this embodiment of the present disclosure may further include the following step 401.

Step 401: After the UE moves from the first region to the second region, the UE does not measure the region corresponding to the first target RAT type.

Optionally, in still another possible implementation of this embodiment of the present disclosure, after the foregoing step 203, the measurement indication method provided in this embodiment of the present disclosure may further include the following steps 501 to 503.

Step 501: The second network-side device sends the second system information to the UE.

Step 502: After the UE moves from the first region to the second region, the UE receives the second system information sent by the second network-side device.

In this embodiment of the present disclosure, the foregoing second system information may include at least one third measurement frequency. The second system information is used to instruct the UE to send a fourth measurement result to the second network-side device. The fourth measurement result is a measurement result obtained through measurement on the first region at the at least one third measurement frequency. The first network-side device serves the cell in which the first region is located, and the second network-side device serves the cell in which the second region is located.

Step 503: If the first measurement result obtained through measurement by the UE on the first region includes the fourth measurement result, the UE sends fifth indication information to the second network-side device.

In this embodiment of the present disclosure, the foregoing fifth indication information is used to indicate that the fourth measurement result is valid.

For example, assume that the first measurement result obtained through measurement by the UE on the first region is the measurement result on the first region at the frequency 8, the frequency 9, and the frequency 10, and that after the UE moves from the first region to the second region, the second system information received by the UE is used to indicate the measurement result required by the second network-side device at the frequency 8 and the frequency 9. Then, the UE may send to the second network-side device the fifth indication information indicating that the fourth measurement result (for example, the measurement result at the frequency 8 and the frequency 9) is valid.

In this embodiment of the present disclosure, after the UE moves from the first region to the second region, the UE may send to the second network-side device the fifth indication information indicating that the fourth measurement result is valid based on the second system information sent by the second network-side device. In this way, the UE can report that the fourth measurement result is valid in the case of a plurality of RATs.

Optionally, in still another possible implementation of this embodiment of the present disclosure, after the foregoing step 203, the measurement indication method provided in this embodiment of the present disclosure may further include the following steps 601 to 603.

Step 601: The second network-side device sends the second system information to the UE.

Step 602: After the UE moves from the first region to the second region, the UE receives sixth indication information sent by the second network-side device.

In this embodiment of the present disclosure, the foregoing second system information may include at least one second RAT type. The second system information is used to instruct the UE to send a fifth measurement result to the second network-side device. The fifth measurement result is the measurement result obtained through measurement on the region corresponding to the at least one second RAT type. The first network-side device serves the cell in which the first region is located, and the second network-side device serves the cell in which the second region is located.

Step 603: If the first measurement result obtained through measurement by the UE on the first region includes the fifth measurement result, the UE sends the sixth indication information to the second network-side device.

In this embodiment of the present disclosure, the foregoing sixth indication information is used to indicate that the fifth measurement result is valid.

For example, assume that the first measurement result obtained through measurement by the UE on the first region is the measurement result on the first region at the frequency 8, the frequency 9, and the frequency 10, that the RAT type corresponding to the frequency 8 and the frequency 9 is the LTE RAT, that the RAT type corresponding to the frequency 10 is the NR RAT, and that after the UE moves from the first region to the second region, the second system information received by the UE is used to indicate the measurement result required by the second network-side device and obtained through measurement on the region corresponding to the NR RAT. Then, the UE may send to the second network-side device the sixth indication information indicating that the fifth measurement result (for example, the measurement result obtained through measurement on the region corresponding to the NR RAT at the frequency 10) is valid.

In this embodiment of the present disclosure, after the UE moves from the first region to the second region, the UE may determine to send to the second network-side device the sixth indication information indicating that the fifth measurement result is valid based on the second system information sent by the second network-side device. In this way, the UE can report that the fifth measurement result is valid in the case of a plurality of RATs.

Figure 6:
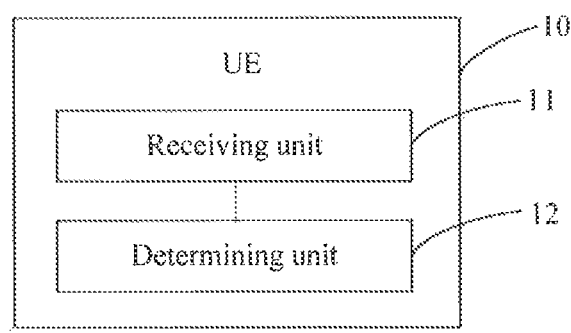
FIG. 6 is a schematic structural diagram 1 of UE according to an embodiment of the present disclosure.

FIG. 6 is a possible schematic structural diagram of UE according to an embodiment of the present disclosure. As shown in FIG. 6, the UE 10 provided in this embodiment of the present disclosure may include a receiving unit 11 and a determining unit 12.

The receiving unit 11 is configured to receive first information sent by a first network-side device, where the first information may be measurement configuration information or first system information. The determining unit 12 is configured to determine second information based on the first information received by the receiving unit 11, where the second information may include a first target RAT type. The first information is the measurement configuration information, and the second information is used to indicate a region measured by the UE and corresponding to the first target RAT type; or the first information is the first system information, and the second information is used to indicate that a measurement result obtained through measurement by the UE and corresponding to the first target RAT type is valid.

In a possible implementation, the UE is located in a first region, the first network-side device serves a cell in which the first region is located, the foregoing first target RAT type may include a RAT type corresponding to at least one second region, and a RAT type corresponding to each of the at least one second region is different from a RAT type corresponding to the first region.

In a possible implementation, the foregoing first target RAT type may further include the RAT type corresponding to the first region.

In a possible implementation, the foregoing measurement configuration information may include the foregoing first target RAT type, or the foregoing first target RAT type and at least one first measurement frequency. The foregoing first system information may include at least one of the first target RAT type or at least one second measurement frequency.

Figure 7:
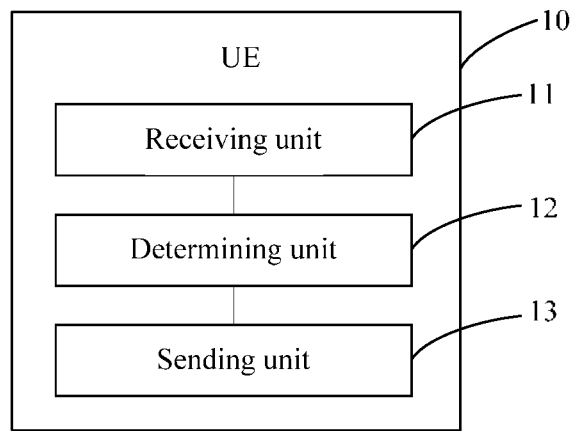
FIG. 7 is a schematic structural diagram 2 of UE according to an embodiment of the present disclosure.

In a possible implementation, with reference to FIG. 6, as shown in FIG. 7, the UE provided in this embodiment of the present disclosure may further include a sending unit 13. The sending unit 13 is configured to skip sending first indication information to the first network-side device, where the first indication information is used to indicate that a first measurement result obtained through measurement by the UE on the first region or the first target RAT is valid, and the first network-side device serves the cell in which the first region is located.

Figure 8:
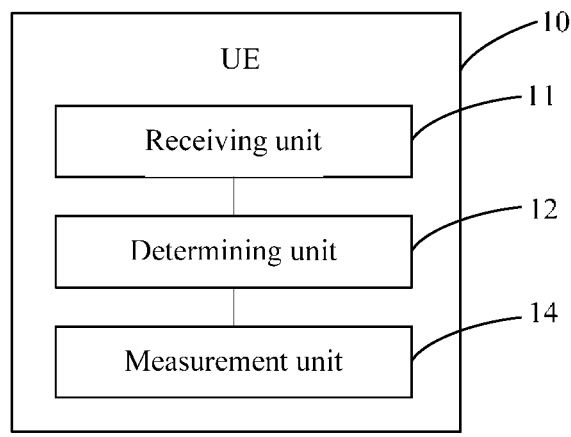
FIG. 8 is a schematic structural diagram 3 of UE according to an embodiment of the present disclosure.

In a possible implementation, with reference to FIG. 6, as shown in FIG. 8, the UE provided in this embodiment of the present disclosure may further include a measurement unit 14. The measurement unit 14 is configured to skip measuring the region corresponding to the first target RAT type.

In a possible implementation, the foregoing first system information includes the at least one second measurement frequency. The first system information is used to indicate that the network-side device wants to receive a second measurement result or supports receiving a second measurement result, and the second measurement result is a measurement result obtained through measurement on the first region measured at the at least one second measurement frequency. The first network-side device serves the cell in which the first region is located.

With reference to FIG. 6, as shown in FIG. 7, the UE provided in this embodiment of the present disclosure may further include a sending unit 13. The sending unit 13 is configured to, if the second measurement result is valid, send second indication information to the first network-side device, where the second indication information is used to indicate that the second measurement result is valid.

In a possible implementation, with reference to FIG. 6, as shown in FIG. 8, the UE provided in this embodiment of the present disclosure may further include a measurement unit 14. The measurement unit 14 is configured to perform measurement at the at least one second measurement frequency to obtain the second measurement result.

In a possible implementation, the foregoing first system information includes the first target RAT type. The first system information is used to indicate that the network-side device wants to receive a third measurement result or supports receiving a third measurement result, and the third measurement result is a measurement result obtained through measurement on the region corresponding to the first target RAT type.

With reference to FIG. 6, as shown in FIG. 7, the UE provided in this embodiment of the present disclosure may further include a sending unit 13. The sending unit 13 is configured to, if the third measurement result is valid, send third indication information to the first network-side device, where the third indication information is used to indicate that the third measurement result is valid.

In a possible implementation, with reference to FIG. 6, as shown in FIG. 8, the UE provided in this embodiment of the present disclosure may further include a measurement unit 14. The measurement unit 14 is configured to measure the region corresponding to the first target RAT type to obtain the third measurement result.

In a possible implementation, with reference to FIG. 6, as shown in FIG. 7, the UE provided in this embodiment of the present disclosure may further include a sending unit 13. The sending unit 13 is configured to, after the UE moves from the first region to the second region, skip sending the first indication information to a second network-side device, where the first indication information is used to indicate that the first measurement result obtained through measurement on the first region is valid. The first network-side device serves the cell in which the first region is located, and the second network-side device serves the cell in which the second region is located.

In a possible implementation, with reference to FIG. 6, as shown in FIG. 8, the UE provided in this embodiment of the present disclosure may further include a measurement unit 14. The measurement unit 14 is configured to, after the UE moves from the first region to the second region, skip measuring the region corresponding to the first target RAT type.

In a possible implementation, the foregoing receiving unit 11 is further configured to, after the UE moves from the first region to the second region, receive second system information sent by the second network-side device, where the second system information includes at least one third measurement frequency. The second system information is used to instruct the UE to send a fourth measurement result to the second network-side device. The fourth measurement result is a measurement result obtained through measurement on the first region at the at least one third measurement frequency. The first network-side device serves the cell in which the first region is located, and the second network-side device serves the cell in which the second region is located.

With reference to FIG. 6, as shown in FIG. 7, the UE provided in this embodiment of the present disclosure may further include a sending unit 13. The sending unit 13 is configured to, if the first measurement result obtained through measurement by the UE on the first region includes the fourth measurement result, send fifth indication information to the second network-side device, where the fifth indication information is used to indicate that the fourth measurement result is valid.

In a possible implementation, the foregoing receiving unit 11 is further configured to, after the UE moves from the first region to the second region, receive the second system information sent by the second network-side device, where the second system information includes at least one second RAT type, the second system information is used to instruct the UE to send a fifth measurement result to the second network-side device, and the fifth measurement result is a measurement result obtained through measurement on the region and corresponding to the at least one second RAT type. The first network-side device serves the cell in which the first region is located, and the second network-side device serves the cell in which the second region is located.

With reference to FIG. 6, as shown in FIG. 7, the UE provided in this embodiment of the present disclosure may further include a sending unit 13. The sending unit 13 is configured to, if the first measurement result obtained through measurement by the UE on the first region includes the fifth measurement result, send sixth indication information to the second network-side device, where the sixth indication information is used to indicate that the fifth measurement result is valid.

In a possible implementation, the foregoing measurement configuration information includes a first identifier and fourth indication information. The first identifier is used to indicate a target region, a RAT type corresponding to the target region includes at least two RAT types, and the first target RAT type is one of the at least two RAT types. The fourth indication information is used to instruct the UE to measure the target region for the first target RAT type.

The UE provided in this embodiment of the present disclosure can implement each process implemented by the UE in the foregoing method embodiment. To avoid repetition, details are not described herein again.

This embodiment of the present disclosure provides the UE. The UE may determine, based on received first information (the first information may be measurement configuration information or system information), second information that includes a first target RAT type (the second information is used to indicate a region measured by the UE and corresponding to the first target RAT type, or is used to indicate that a measurement result obtained through measurement by the UE and corresponding to the first target RAT type is valid). The UE may determine the region measured by the UE and corresponding to the first target RAT type based on the measurement configuration information, so that the UE can quickly and accurately measure the region corresponding to the first target RAT type and then a system corresponding to the first target RAT type can configure a secondary cell for the UE in a timely manner. Alternatively, based on the received system information, the UE may report that the measurement result obtained through measurement by the UE and corresponding to the first target RAT type is valid when the measurement result reported by the UE to the first network-side device is valid, so that the UE can quickly and accurately indicate to the network-side device that the measurement result obtained through measurement by the UE and corresponding to the first target RAT type is valid and then a system corresponding to the first target RAT type can configure a secondary cell for the UE in a timely manner.

Figure 9:
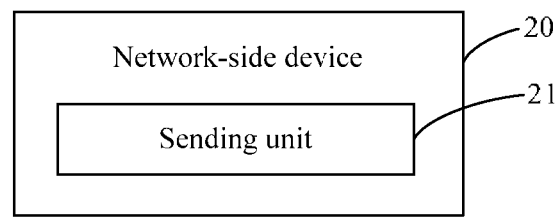
FIG. 9 is a schematic structural diagram of a network-side device according to an embodiment of the present disclosure.

FIG. 9 is a possible schematic structural diagram of a network-side device according to an embodiment of the present disclosure. As shown in FIG. 9, the network-side device 20 provided in this embodiment of the present disclosure may include a sending unit 21.

The sending unit 21 is configured to send first information to UE, where the first information is measurement configuration information or system information, the first information is used to determine second information, and the second information includes a first target radio access technology RAT type. The first information is the measurement configuration information, and the second information is used to indicate a region measured by the UE and corresponding to the first target RAT type; or the first information is the system information, and the second information is used to indicate that a measurement result obtained through measurement by the UE and corresponding to the first target RAT type is valid.

In a possible implementation, the UE is located in a first region, the network-side device serves a cell in which the first region is located, the foregoing first target RAT type may include a RAT type corresponding to at least one second region, and a RAT type corresponding to each of the at least one second region is different from a RAT type corresponding to the first region.

In a possible implementation, the foregoing first target RAT type may further include the RAT type corresponding to the first region.

In a possible implementation, the foregoing measurement configuration information may include the first target RAT type, or the first target RAT type and at least one first measurement frequency. The foregoing system information may include at least one of the first target RAT type or at least one second measurement frequency.

In a possible implementation, the foregoing measurement configuration information may include a first identifier and target indication information. The first identifier is used to indicate a target region, a RAT type corresponding to the target region includes at least two RAT types, and the first target RAT type is one of the at least two RAT types. The target indication information is used to instruct the UE to measure the target region for the first target RAT type.

The network-side device provided in this embodiment of the present disclosure can implement each process implemented by the network-side device in the foregoing method embodiment. To avoid repetition, details are not described herein again.

This embodiment of the present disclosure provides the network-side device. The network-side device may send first information (the first information may be measurement configuration information or system information) to the UE, so that the UE can determine, based on the received first information, second information that includes a first target RAT type (the second information is used to indicate a region measured by the UE and corresponding to the first target RAT type, or is used to indicate that a measurement result obtained through measurement by the UE and corresponding to the first target RAT type is valid). The UE may determine the region measured by the UE and corresponding to the first target RAT type based on the measurement configuration information, so that the UE can quickly and accurately measure the region corresponding to the first target RAT type and then a system corresponding to the first target RAT type can configure a secondary cell for the UE in a timely manner. Alternatively, based on the received system information, the UE may report that the measurement result obtained through measurement by the UE and corresponding to the first target RAT type is valid when the measurement result reported by the UE to the first network-side device is valid, so that the UE can quickly and accurately indicate to the network-side device that the measurement result obtained through measurement by the UE and corresponding to the first target RAT type is valid and then a system corresponding to the first target RAT type can configure a secondary cell for the UE in a timely manner.

Figure 10:
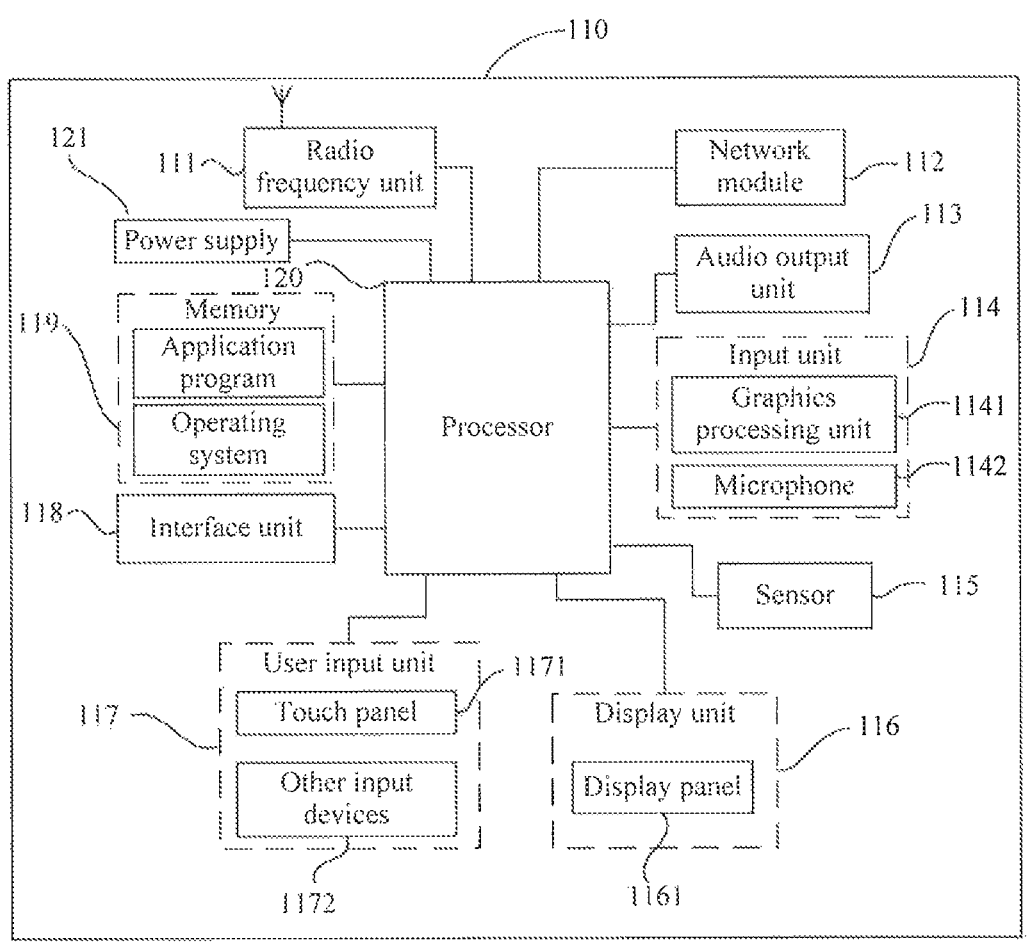
FIG. 10 is a schematic diagram of hardware of UE according to an embodiment of the present disclosure.

FIG. 10 is a schematic diagram of hardware of UE according to an embodiment of the present disclosure. As shown in FIG. 10, the UE 110 includes but is not limited to components such as a radio frequency unit 111, a network module 112, an audio output unit 113, an input unit 114, a sensor 115, a display unit 116, a user input unit 117, an interface unit 118, a memory 119, a processor 120, and a power supply 121.

It should be noted that a person skilled in the art can understand that the structure of the UE shown in FIG. 10 does not constitute a limitation on the UE. The UE may include more or fewer components than those shown in FIG. 10, or some components may be combined, or the components may be disposed in different manners. For example, in this embodiment of the present disclosure, the UE includes but is not limited to a mobile phone, a tablet computer, a notebook computer, a palmtop computer, an in-vehicle terminal, a wearable device, a pedometer, or the like.

The radio frequency unit 111 may be configured to receive first information sent by a first network-side device, where the first information is measurement configuration information or system information. The processor 120 may be configured to determine second information based on the first information received by the radio frequency unit 111, where the second information includes a first target radio access technology RAT type. The first information is the measurement configuration information, and the second information is used to indicate a region measured by the UE and corresponding to the first target RAT type; or the first information is the system information, and the second information is used to indicate that a measurement result obtained through measurement by the UE and corresponding to the first target RAT type is valid.

This embodiment of the present disclosure provides the UE. The UE may determine, based on received first information (the first information may be measurement configuration information or system information), second information that includes a first target RAT type (the second information is used to indicate a region measured by the UE and corresponding to the first target RAT type, or is used to indicate that a measurement result obtained through measurement by the UE and corresponding to the first target RAT type is valid). The UE may determine the region measured by the UE and corresponding to the first target RAT type based on the measurement configuration information, so that the UE can quickly and accurately measure the region corresponding to the first target RAT type and then a system corresponding to the first target RAT type can configure a secondary cell for the UE in a timely manner. Alternatively, based on the received system information, the UE may report that the measurement result obtained through measurement by the UE and corresponding to the first target RAT type is valid when the measurement result reported by the UE to the first network-side device is valid, so that the UE can quickly and accurately indicate to the network-side device that the measurement result obtained through measurement by the UE and corresponding to the first target RAT type is valid and then a system corresponding to the first target RAT type can configure a secondary cell for the UE in a timely manner.

It should be understood that in this embodiment of the present disclosure, the radio frequency unit 111 may be configured to receive and send signals in an information reception or transmission or call process. Specifically, after receiving downlink data from a base station, the radio frequency unit 111 sends the downlink data to the processor 120 for processing, and in addition, sends uplink data to the base station. Generally, the radio frequency unit 111 includes but is not limited to an antenna, at least one amplifier, a transceiver, a coupler, a low noise amplifier, a duplexer, and the like. In addition, the radio frequency unit 111 may further communicate with a network and another device through a wireless communications system.

The UE provides wireless broadband Internet access for a user by using the network module 112, for example, helps the user send and receive e-mails, browse web pages, and access streaming media.

The audio output unit 113 may convert audio data received by the radio frequency unit 111 or the network module 112 or stored in the memory 119 into an audio signal and output the audio signal as a sound. In addition, the audio output unit 113 may further provide an audio output (for example, a call signal reception sound or a message reception sound) related to a specific function performed by the UE 110. The audio output unit 113 includes a speaker, a buzzer, a telephone receiver, and the like.

The input unit 114 is configured to receive an audio or video signal. The input unit 114 may include a graphics processing unit (Graphics Processing Unit, GPU) 1141 and a microphone 1142, and the graphics processing unit 1141 processes image data of a still picture or a video obtained by an image capture apparatus (for example, a camera) in an image capture mode or a video capture mode. A processed image frame may be displayed on the display unit 116. An image frame processed by the graphics processing unit 1141 may be stored in the memory 119 (or another storage medium) or sent by the radio frequency unit 111 or the network module 112. The microphone 1142 can receive a sound and can process the sound into audio data. The processed audio data can be converted, for outputting, into a format that can be sent to a mobile communication base station through the radio frequency unit 111 in a telephone call mode.

The UE 110 further includes at least one sensor 115, for example, an optical sensor, a motion sensor, and another sensor. Specifically, the optical sensor includes an ambient light sensor and a proximity sensor, where the ambient light sensor can adjust luminance of the display panel 1161 based on brightness of ambient light, and the proximity sensor can turn off the display panel 1161 and/or backlight when the UE 110 is moved to an ear. As a type of motion sensor, an accelerometer sensor can detect magnitudes of accelerations in all directions (usually three axes), can detect a magnitude and a direction of gravity when the mobile phone is in a static state, and can be applied to UE posture recognition (such as screen switching between portrait and landscape, related games, and magnetometer posture calibration), functions related to vibration recognition (such as pedometer and tapping), and the like. The sensor 115 may also include a fingerprint sensor, a pressure sensor, an iris sensor, a molecular sensor, a gyroscope, a barometer, a hygrometer, a thermometer, an infrared sensor, and the like. Details are not described herein.

The display unit 116 is configured to display information input by the user or information provided for the user. The display unit 116 may include the display panel 1161. The display panel 1161 may be configured in a form of a liquid crystal display (Liquid Crystal Display, LCD), an organic light-emitting diode (Organic Light-Emitting Diode, OLED), or the like.

The user input unit 117 may be configured to receive input digit or character information and generate key signal input related to user setting and function control of the UE. Specifically, the user input unit 117 includes a touch panel 1171 and other input devices 1172. The touch panel 1171, also referred to as a touchscreen, may capture a touch operation performed by a user on or near the touch panel (for example, an operation performed by the user on the touch panel 1171 or near the touch panel 1171 by using any appropriate object or accessory such as a finger or a stylus). The touch panel 1171 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 120, and receives and executes a command sent by the processor 120. In addition, the touch panel 1171 may be implemented in a plurality of forms, for example, as a resistive, capacitive, infrared, or surface acoustic wave touch panel. The user input unit 117 may further include other input devices 1172 in addition to the touch panel 1171. Specifically, the other input devices 1172 may include but are not limited to a physical keyboard, a function key (such as a volume control key or a power on/off key), a trackball, a mouse, a joystick, and the like. Details are not described herein.

Further, the touch panel 1171 may cover the display panel 1161. After detecting a touch operation on or near the touch panel 1171, the touch panel 1171 transmits the touch operation to the processor 120 to determine a type of a touch event. Then the processor 120 provides corresponding visual output on the display panel 1161 based on the type of the touch event. Although in FIG. 10, the touch panel 1171 and the display panel 1161 act as two independent parts to implement input and output functions of the UE, in some embodiments, the touch panel 1171 and the display panel 1161 may be integrated to implement the input and output functions of the UE. This is not specifically limited herein.

The interface unit 118 is an interface connecting an external apparatus to the UE 110. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, an earphone port, or the like. The interface unit 118 may be configured to receive input (for example, data information and power) from the external apparatus, and transmit the received input to one or more elements of the UE 110, or may be configured to transmit data between the UE 110 and the external apparatus.

The memory 119 may be configured to store a software program and various data. The memory 119 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 119 may include a high-speed random access memory, or may include a non-volatile memory, for example, at least one magnetic disk storage device, a flash memory device, or other volatile solid-state storage devices.

The processor 120 is a control center of the UE, and is connected to all components of the UE by using various interfaces and lines. By running or executing a software program and/or module that is stored in the memory 119 and calling data stored in the memory 119, the processor 120 executes various functions of the UE and processes data, so as to perform overall monitoring on the UE. The processor 120 may include one or more processing units. Optionally, the processor 120 may integrate an application processor and a modem processor. The application processor mainly processes an operating system, a user interface, an application program, and the like. The modem processor mainly processes wireless communication. It may be understood that the modem processor may alternatively not be integrated into the processor 120.

The UE 110 may further include a power supply 121 (such as a battery) that supplies power to each component. Optionally, the power supply 121 may be logically connected to the processor 120 by using a power management system, to implement functions such as charging management, discharging management, and power consumption management by using the power management system.

In addition, the UE 110 includes some function modules that are not shown, details of which are not described herein.

Optionally, an embodiment of the present disclosure further provides UE, including a processor 120, a memory 119, and a computer program stored in the memory 119 and capable of running on the processor 120 that are shown in FIG. 10. When the computer program is executed by the processor 120, processes of the foregoing method embodiments can be implemented and a same technical effect can be achieved. To avoid repetition, details are not described herein again.

Figure 11:
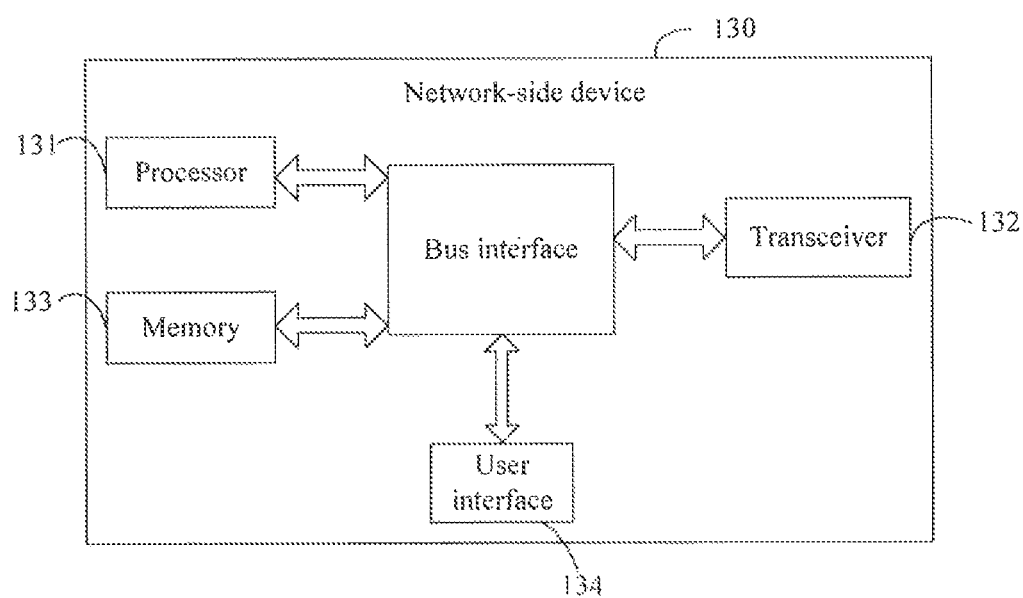
FIG. 11 is a schematic diagram of hardware of a network-side device according to an embodiment of the present disclosure.

FIG. 11 shows a schematic diagram of hardware of a network-side device according to an embodiment of the present disclosure. As shown in FIG. 11, the network-side device 130 includes a processor 131, a transceiver 132, a memory 133, a user interface 134, and a bus interface.

The transceiver 132 is configured to send first information to UE, where the first information is measurement configuration information or system information, the first information is used to determine second information, and the second information includes a first target radio access technology RAT type. The first information is the measurement configuration information, and the second information is used to indicate a region measured by the UE and corresponding to the first target RAT type; or the first information is the system information, and the second information is used to indicate that a measurement result obtained through measurement by the UE and corresponding to the first target RAT type is valid.

This embodiment of the present disclosure provides the network-side device. The network-side device may send first information (the first information may be measurement configuration information or system information) to the UE, so that the UE can determine, based on the received first information, second information that includes a first target RAT type (the second information is used to indicate a region measured by the UE and corresponding to the first target RAT type, or is used to indicate that a measurement result obtained through measurement by the UE and corresponding to the first target RAT type is valid). The UE may determine the region measured by the UE and corresponding to the first target RAT type based on the measurement configuration information, so that the UE can quickly and accurately measure the region corresponding to the first target RAT type and then a system corresponding to the first target RAT type can configure a secondary cell for the UE in a timely manner. Alternatively, based on the received system information, the UE may report that the measurement result obtained through measurement by the UE and corresponding to the first target RAT type is valid when the measurement result reported by the UE to the first network-side device is valid, so that the UE can quickly and accurately indicate to the network-side device that the measurement result obtained through measurement by the UE and corresponding to the first target RAT type is valid and then a system corresponding to the first target RAT type can configure a secondary cell for the UE in a timely manner.

The processor 131 may be responsible for bus architecture management and general processing. The processor 131 may be configured to read and execute the program in the memory 133 to implement a processing function and control the network-side device 130. The memory 133 may store data that the processor 131 uses when performing an operation. The processor 131 and the memory 133 may be integrated together or independently disposed.

In an embodiment of the present disclosure, the network-side device 130 may further include a computer program stored on the memory 133 and capable of running on the processor 131, where when the computer program is executed by the processor 131, the steps of the methods provided in the embodiments of the present disclosure are implemented.

In FIG. 11, a bus architecture may include any quantity of interconnected buses and bridges, and specifically connect together various circuits of one or more processors represented by the processor 131 and a memory represented by the memory 133. The bus architecture may further connect together various other circuits such as a peripheral device, a voltage stabilizer, and a power management circuit. These are well known in the art, and therefore are not further described in the embodiments of the present disclosure any more. The bus interface provides an interface. The transceiver 132 may be a plurality of elements, including a transmitter and a receiver, and provides units configured to perform communication with various other apparatuses over a transmission medium. For different UE, the user interface 134 may also be an interface that can be externally or internally connected to a required device. The connected device includes but is not limited to a keypad, a display, a speaker, a microphone, and a joystick.

An embodiment of the present disclosure further provides a computer-readable storage medium, where the computer-readable storage medium stores a computer program. When the computer program is executed by the processor 120 shown in FIG. 10 or the processor 131 shown in FIG. 11, the processes of the foregoing method embodiments are implemented, with the same technical effects achieved. To avoid repetition, details are not described herein again. For example, the computer-readable storage medium is a read-only memory (Read-Only Memory, ROM), a random access memory (Random Access Memory, RAM), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing implementations, a person skilled in the art can clearly understand that the method in the foregoing embodiments may be implemented by software in addition to a necessary universal hardware platform or by hardware only. In most cases, the former is a more preferred implementation. Based on such an understanding, the technical solutions of this application essentially or the part contributing to the prior art may be implemented in a form of a software product. The software product may be stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in each embodiment of this application.

The embodiments of this application are described above with reference to the accompanying drawings, but this application is not limited to the embodiments. The embodiments are only illustrative rather than restrictive. Inspired by this application, a person of ordinary skill in the art can still derive a plurality of variations without departing from the essence of this application and the protection scope of the claims. All these variations shall fall within the protection of this application.

What is claimed is:

1. A measurement indication method, wherein the method comprises:
    receiving, by user equipment (UE), first information sent by a network-side device, wherein the first information is measurement configuration information or system information; and
    determining, by the UE, second information based on the first information, wherein the second information comprises a first target radio access technology (RAT) type; wherein
    the first information is the measurement configuration information, and the second information is used to indicate a region measured by the UE and corresponding to the first target RAT type; or the first information is the system information, and the second information is used to indicate that a measurement result obtained through measurement by the UE and corresponding to the first target RAT type is valid.

2. The method according to claim 1, wherein the UE is located in a first region, the network-side device serves a cell in which the first region is located, the first target RAT type comprises a RAT type corresponding to at least one second region, and a RAT type corresponding to each of the at least one second region is different from a RAT type corresponding to the first region.

3. The method according to claim 2, wherein the first target RAT type further comprises the RAT type corresponding to the first region.

4. The method according to claim 1, wherein the measurement configuration information comprises the first target RAT type, or the first target RAT type and at least one first measurement frequency; and
    the system information comprises at least one of the first target RAT type or at least one second measurement frequency.

5. The method according to claim 1, wherein the method further comprises:
    skipping sending, by the UE, first indication information to the network-side device, wherein the first indication information is used to indicate that a first measurement result obtained through measurement on a first region or a first target RAT is valid; and the network-side device serves a cell in which the first region is located.

6. The method according to claim 1, wherein the method further comprises:
    skipping measuring, by the UE, the region corresponding to the first target RAT type.

7. The method according to claim 1, wherein the system information comprises at least one second measurement frequency, and the system information is used to indicate that the network-side device wants to receive a second measurement result or supports receiving a second measurement result; and
    the method further comprises:
    if the second measurement result is valid, sending, by the UE, second indication information to the network-side device, wherein the second indication information is used to indicate that the second measurement result is valid.

8. The method according to claim 7, wherein the method further comprises:
    performing measurement, by the UE, at the at least one second measurement frequency to obtain the second measurement result.

9. The method according to claim 1, wherein the system information comprises the first target RAT type; and the system information is used to indicate that the network-side device wants to receive a third measurement result or supports receiving a third measurement result; and
    the method further comprises:
    if the third measurement result is valid, sending, by the UE, third indication information to the network-side device, wherein the third indication information is used to indicate that the third measurement result is valid.

10. The method according to claim 9, wherein the method further comprises:
    measuring, by the UE, the region corresponding to the first target RAT type to obtain the third measurement result.

11. The method according to claim 1, wherein the measurement configuration information comprises a first identifier and fourth indication information, the first identifier is used to indicate a target region, a RAT type corresponding to the target region comprises at least two RAT types, the first target RAT type is one of the at least two RAT types, and the fourth indication information is used to instruct the UE to measure the target region for the first target RAT type.

12. A measurement indication method, wherein the method comprises:
    sending, by a network-side device, first information to user equipment (UE), wherein the first information is measurement configuration information or system information, the first information is used to determine second information, and the second information comprises a first target radio access technology (RAT) type, wherein
    the first information is the measurement configuration information, and the second information is used to indicate a region measured by the UE and corresponding to the first target RAT type; or the first information is the system information, and the second information is used to indicate that a measurement result obtained through measurement by the UE and corresponding to the first target RAT type is valid.

13. The method according to claim 12, wherein the UE is located in a first region, the network-side device serves a cell in which the first region is located, the first target RAT type comprises a RAT type corresponding to at least one second region, and a RAT type corresponding to each of the at least one second region is different from a RAT type corresponding to the first region.

14. The method according to claim 13, wherein the first target RAT type further comprises the RAT type corresponding to the first region.

15. The method according to claim 12, wherein the measurement configuration information comprises the first target RAT type, or the first target RAT type and at least one first measurement frequency; and the system information comprises at least one of the first target RAT type or at least one second measurement frequency.

16. The method according to claim 12, wherein the measurement configuration information comprises a first identifier and target indication information, the first identifier is used to indicate a target region, a RAT type corresponding to the target region comprises at least two RAT types, the first target RAT type is one of the at least two RAT types, and the target indication information is used to instruct the UE to measure the target region for the first target RAT type.

17. User equipment (UE), comprising a processor, a memory, and a program stored in the memory and capable of running on the processor, wherein when the program is executed by the processor, the processor is configured to:

receive first information sent by a network-side device, wherein the first information is measurement configuration information or system information; and determine second information based on the first information received by the receiving unit, wherein the second information comprises a first target radio access technology (RAT) type; wherein the first information is the measurement configuration information, and the second information is used to indicate a region measured by the UE and corresponding to the first target RAT type; or the first information is the system information, and the second information is used to indicate that a measurement result obtained through measurement by the UE and corresponding to the first target RAT type is valid.

18. The UE according to claim 17, wherein the UE is located in a first region, the network-side device serves a cell in which the first region is located, the first target RAT type comprises a RAT type corresponding to at least one second region, and a RAT type corresponding to each of the at least one second region is different from a RAT type corresponding to the first region.

19. The UE according to claim 18, wherein the first target RAT type further comprises the RAT type corresponding to the first region.

20. A network-side device, comprising a processor, a memory, and a program stored in the memory and capable of running on the processor, wherein when the program is executed by the processor, the processor is configured to implement steps of the measurement indication method according to claim 12.

* * * * *